United States Patent Office 3,385,877
Patented May 28, 1968

3,385,877
CYCLOPOLYSILOXANES
Tse C. Wu, Waterford, N.Y., assignor to General Electric Company, a corporation of New York
No Drawing. Filed Feb. 9, 1965, Ser. No. 431,463
5 Claims. (Cl. 260—448.2)

ABSTRACT OF THE DISCLOSURE

This invention is directed to spirocyclosiloxanes in which a spiro silicon atom is a member of a first ring containing two or three diarylsiloxane units and a member of a second ring containing four or five methylene radicals. These spirocyclosiloxanes are useful in forming silicone elastomers which can be used for coating glass cloth.

---

This invention relates to organocyclopolysiloxanes. More particularly, this invention relates to organocyclopolysiloxanes having the formula:

(1)
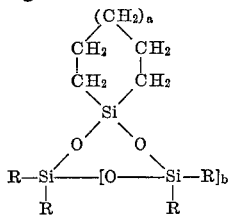

where R is a monovalent aryl radical, $a$ is an integral number of from 0 to 1, inclusive, and $b$ is an integral number of from 1 to 2, inclusive.

Attempts to incorporate a large proportion of silicon-bonded aryl groups in silicone rubbers has not, in general, met with great success. While the polymerization of hexaphenylcyclotrisiloxane might be expected to result in polymeric organopolysiloxanes ideally suited for the preparation of silicone rubber, it has generally been found that these high molecular weight polydiphenylsiloxanes are hard, intractable materials. As a result, they have only limited utility, particularly in the preparation of silicone rubber. It has previously been suggested that the incorporation of dimethylsiloxy units in polydiphenylsiloxane chains would create a polymer having the advantages of the diphenyl system while being more flexible than a polymer formed purely from diphenylsiloxy units. A material has now been found which retains the advantages of the phenyl-containing organopolysiloxanes while providing an even greater degree of flexibility than dimethylsiloxy units. The larger unit provided by a heterocyclic silicon-containing 5 or 6 membered ring provides even greater dissymmetry and thus greater flexibility than a dimethylsiloxy unit. The most convenient method for incorporating such a unit is by means of a cyclopolysiloxane where one of the silicon atoms is also a member of a heterocyclic hexane or pentane ring.

Briefly, the present invention involves cyclopolysiloxanes wherein one of the silicon atoms is attached to a tetramethylene or pentamethylene group. Thus, the cyclopolysiloxanes of the present invention can be described by the generic formula:

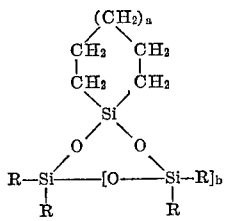

where R, $a$ and $b$ are as previously defined.

The compounds of the present invention are formed by the reaction of 1,1-dichlorosilacycloalkanes with diarylpolysiloxanediols in a solvent in the presence of an acid acceptor according to the equation:

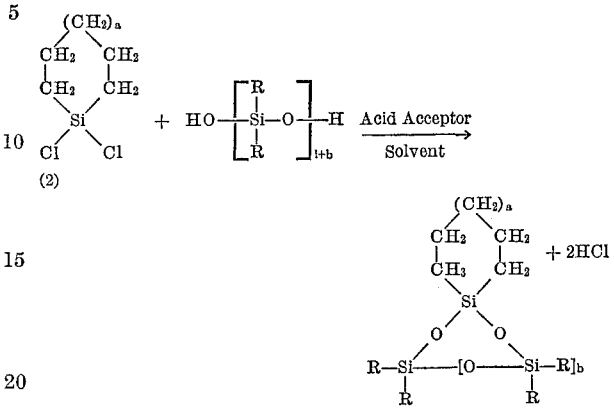

where R, $a$ and $b$ are as previously defined. Among the aryl radicals which R can represent are phenyl, ortho-tolyl, meta-tolyl, para-tolyl, meta-trifluoromethylphenyl, ortho-trifluoromethylphenyl, para-trifluoromethylphenyl, cyanophenyl, benzoylphenyl, para-phenoxyphenyl, xylyl, ethylphenyl, naphthyl, biphenyl, etc.

The solvent which can be utilized for the reaction is essentially any organic material which is inert to the reactants under the conditions of reaction. However, the preferred solvents are the hydrocarbons, such as benzene, toluene, xylene, pentane, hexane, heptane, etc. Polar solvents, such as ethers and ketones, are usable, but are not preferred. The polar solvents tend to keep the acid acceptor-hydrogen chloride salts formed in the reaction in solution. Any of the utilizable solvents can be mixed, that is, one solvent can be used for one of the reactants and a different solvent for the other reactant.

Preferably, the two reactants are added to a reaction vessel simultaneously, each being contained in a solvent medium. However, if desired, the chlorosilane can be added to a solvent solution of the polysiloxanediol. Since a cyclic polysiloxane is to be formed, the conditions of reaction should favor the formation of such a compound. In general, the more dilute the solution, the more the formation of a cyclic is favored. Thus, the final concentration should be no more than about 2 moles of total reactant per liter of solvent, and preferably no more than about 0.5 mole of total reactant per liter of solvent.

The product of the present invention can be formed with the two reactants shown in Equation 2 in a stoichiometric ratio of 1:1 or a 50% excess, based on the stoichiometric ratio, of either of the reactants.

The acid acceptor absorbs generated hydrogen chloride in a molar ratio of 1:1. Since one mole of hydrogen chloride is generated for each mole of reactant, there must be at least one mole of acid acceptor for each mole of reactant. Preferably, the acid acceptor is present in an amount at least 50% in excess of the stoichiometric requirement and can be present in an excess of several hundred percent. Among the acid acceptors which can be utilized are the tertiary amines, including pyridine, picoline, 1,4-diazobicyclo(2,2,2)octane, and the dialkyl anilines.

The reaction can be conducted at any temperature from about 10° C. to the boiling point of the reaction mixture. Preferably, the reaction is conducted at room temperature both for convenience and because the reaction is accomplished rapidly, even at this temperature.

The reactant should be added over a period of from about 30 minutes to 2 hours, to aid in assuring the formation of cyclics. The relatively slow addition rate prevents the concentration of reactants from rising beyond a desirable level and thus maintains the dilute solution which promotes the formation of cyclics. Preferably, the reaction mixture is stirred for at least one hour following the addition to assure completion of the reaction.

Following completion of the reaction, the reaction mixture is filtered to remove the acid acceptor-hydrogen chloride salts. The solvent is then evaporated and the resultant compound is further purified either by a vacuum distillation or by recrystallization from hydrocarbon solvents, such as pentane, petroleum ether, hexane, and cyclohexane.

The formation of the cyclopolysiloxanes of the present invention will now be described in greater detail. These examples should be considered as illustrative only, and not as limiting in any way the full scope of the invention as covered in the appended claims.

In several of the following examples, tolyl-substituted polysiloxanediols were utilized. The preparation of these materials will be illustrated by the preparation of sym-tetra-m-tolyldisiloxanediol. All parts in this illustration are by weight. A solution containing 500 parts of ether, 126.8 parts of sodium bicarbonate, and a small quantity of water were placed in a reaction vessel. To the vessel was added a second solution containing 126.8 parts of sym-dichlorotetra-m-tolyldisiloxane in 250 parts of ether, over a period of 1.5 hours. The resulting slurry was stirred at room temperature for 18 hours, filtered, and the filtrate placed in a flash evaporator to remove the solvent. A 95% yield of crude product melting at 60°–68° C. was obtained. The crude product was recrystallized twice from petroleum ether and gave a material having the formula:

(3)

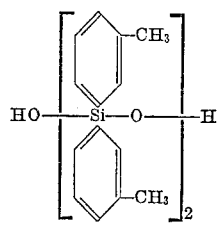

which had a melting point of 68.5°–69.5° C. By a similar procedure, sym-tetra-p-tolyldisiloxanediol was prepared with a 78% yield of a pure product melting at 100.5°–102.5° C. Further, hexa-p-tolyltrisiloxane-1,5-diol was prepared and had a melting point of 139°—141° C. The structure of each of the tolyl-substituted polysiloxanediols was substantiated by infrared analysis.

EXAMPLE 1

In this example, the compound 3,3,5,5,7,7-hexaphenyl-cyclotetrasiloxane-spiro-1-silacyclohexane was produced. Into a reaction vessel were placed 400 ml. of sodium-dried diethyl ether and 30 ml. (0.37 mole) of pyridine. Two 200 ml. solutions were prepared, the first containing 41.5 g. (0.07 mole) of hexaphenyltrisiloxane-1,5-diol in diethyl ether and the second containing 16.9 g. (0.1 mole) of 1,1-dichlorosilacyclohexane, also in diethyl ether. The two solutions were added simultaneously, at the same rate, to the ether-pyridine mixture, over a period of about 1 hour. The reaction mixture was stirred for an additional 6 hours and then allowed to stand at room temperature overnight. The reaction mixture was filtered to remove the white solids which consisted chiefly of pyridine hydrochloride. The ether solvent was then evaporated from the filtrate and the residue was washed with petroleum ether, yielding 40 g. of solids melting at 55°–65° C. The solids were recrystallized twice from ethanol and yielded 28 g. (58% based on the theoretical) of the desired material having the structural formula:

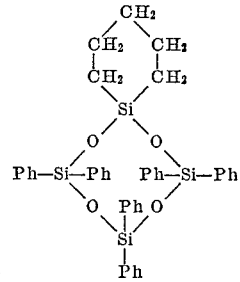

where Ph is the phenyl radical. The material had a melting point of 106°–107° C. and its structure was substantiated by an infrared spectrum. Additionally, an elemental analysis was run, the results agreeing quite favorably with the desired structure. The analysis showed 69.16% carbon, 5.80% hydrogen, and 15.83% silicon, as compared with the theoretical values of 69.40% carbon, 5.64% hydrogen, and 15.84% silicon.

EXAMPLE 2

In this example the compound 3,3,5,5-tetraphenylcyclotrisiloxane-spiro-1-silacyclohexane was formed. Into a reaction vessel were placed 40 ml. of pyridine (0.51 mole) and 750 ml. of benzene. Two 300 ml. solutions were prepared. The first contained 30.4 g. (0.18 mole) of 1,1-dichlorosilacyclohexane in benzene and the second solution contained 74.5 g. (0.18 mole) of sym-tetraphenyldisiloxanediol in benzene. The two solutions were added to the pyridine-benzene mixture simultaneously, at about the same rate, over a period of about 50 minutes. The mixture was then stirred for 6 hours and allowed to stand at room temperature for two days. It was filtered and the benzene distilled from the filtrate. The residue was added, with stirring, to petroleum ether and a precipitate formed which, on filtration, yielded 20.8 g. (23% based on the theoretical) of a product having the structural formula:

(5)

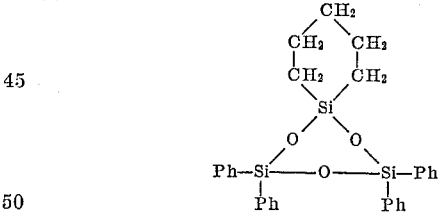

where Ph is the phenyl radical. This crude product melted at 126°–128° C. It was recrystallized twice from cyclohexane and yielded glistening crystals melting at 130°–131° C. An infrared spectrum showed a band at 9.8 microns, indicative of the cyclotrisiloxane structure, and a band at 10.9 microns, indicative of the silacyclohexane structure. An elemental analysis showed 67.94% carbon, 5.72% hydrogen, and 16.69% silicon comparing favorably with the theoretical values for the compound of Formula 5 of 68.14% carbon, 5.89% hydrogen, and 16.50% silicon.

EXAMPLE 3

In this example, 3,3,5,5-tetra-p-tolylcyclotrisiloxane-spiro-1-silacyclohexane was produced. Into a reaction vessel were placed 3 g. (0.04 mole) of pyridine and 100 ml. of benzene. Two 100 ml. solutions were prepared, the first containing 4.7 g. (0.01 mole) of sym-tetra-p-tolyldisiloxanediol in benzene and the second containing 1.7 g. (0.01 mole) of 1,1-dichlorosilacyclohexane in benzene. These two solutions were added simultaneously, at the same rate, to the pyridine-benzene mixture over a period of about 1 hour. Stirring was continued for 15 hours following addition, at room temperature. The precipitate which had formed was then filtered from the solution and the filtrate was flash evaporated to remove the solvent. The residue was extracted with toluene, filtered to remove additional solids, the toluene evaporated from the filtrate, and the remaining solid residue washed with ethanol and filtered. There resulted 3.1 g. (55% based on the theoretical) of white solids with a melting point of 151°–158° C. This crude product was recrystallized from a 1:1 mixture of hexane and ethanol and then from hexane alone and yielded a pure product having the structure:

(6)
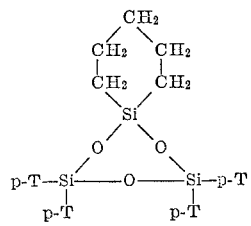

where p-T is the para-tolyl radical, with a melting point of 158.5°–160.5° C.

EXAMPLE 4

In this example, the meta-tolyl analog of the product produced in Example 3 was made. Into a reaction vessel were placed 15 ml. (0.19 mole) of pyridine and 400 ml. of benzene. Two 220 ml. solutions were formed, the first containing 6.8 g. (0.04 mole) of 1,1-dichlorosilacyclohexane in benzene and the second containing 18.8 g. (0.04 mole) of sym-tetra-m-tolyldisiloxanediol in benzene. The two solutions were added to the benzene-pyridine mixture over a period of 1.5 hours and the reaction mixture was then stirred for an additional 7 hours. The solids which formed were filtered off and the solvent evaporated from the filtrate. The residue was again extracted with toluene, the resulting additional solids filtered from the solution, and the solvent evaporated from the filtrate. The residue was washed with cyclohexane, the cyclohexane evaporated, and this residue distilled to yield the desired product boiling at 270°–276° C. at 0.03 mm. and having the structure:

(7)
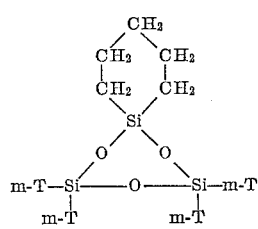

where m-T is the meta-tolyl radical. An infrared spectrum of the liquid product substantiated that it was essentially the meta-tolylspiro compound. A quantity of 10.5 g. (44% based on the theoretical) was obtained.

EXAMPLE 5

In this example, 3,3,5,5,7,7-hexa-p-tolylcyclotetrasiloxane-spiro-1-silacyclopentane is formed. Into a reaction vessel are placed 40 ml. (0.51 mole) of pyridine and 500 ml. of benzene. Two 500 ml. solutions are prepared, the first containing 10.9 g. (0.07 mole) of 1,1-dichlorosilacyclopentane in benzene and the second containing 61.2 g. (0.1 mole) of hexaphenyltrisiloxane-1,5-diol in benzene. The two solutions are added simultaneously, at the same rate, to the pyridine-benzene mixture over a period of 2 hours. The resulting reaction mixture is stirred for an additional 3 hours, the solids filtered from the mixture, the benzene evaporated from the filtrate, and the residue washed in toluene. The toluene is evaporated from the residue and the resulting solids are recrystallized from cyclohexane and from ethanol. A product having the formula:

(8)
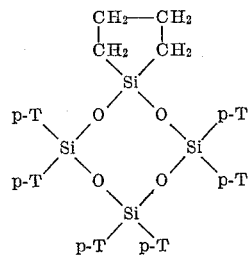

where p-T is the para-tolyl radical, results.

As previously mentioned, the cyclopolysiloxanes are useful in the formation of silicone elastomers. For example, a small quantity of the spiro compound formed in Example 3 was placed in a bath heated to 170° C. When the spiro compound became molten, a quantity of potassium naphthalene catalyst corresponding to 36 p.p.m., as KOH, was added. Polymerization began to occur in about 30 seconds and heating was continued for an additional 15 minutes. The intrinsic viscosity of the polymer, after the 15 minute heating, was found to be 0.63 dl./g. A solution is formed containing 100 parts of this polymer in 400 parts of toluene. A glass cloth is impregnated with this solution by dipping and the cloth is wrapped around a dynamo electric machine coil. The coil is heated to about 120° C. to evaporate the toluene and the coil is then placed in an air-circulating oven heated to about 200° C. for about two hours. The polymer is cross-linked by the heating through oxidation of the methyl portion of the tolyl radical. The result is a coil insulated by the cured silicone-impregnated cloth.

Additionally, the spirocyclosiloxanes of the present invention can be copolymerized with other organo-silicon materials, such as octamethylcyclotetrasiloxane and hexaphenyltrisiloxane to yield improved polysiloxane materials. These spiro compounds can be used in amounts of from about 0.1 to 99.9 mole percent with from 99.9 to 0.1 mole percent of the other siloxane materials.

What I claim as new and desire to secure by Letters Patent of the United States is:

1. An organocyclopolysiloxane of the formula:

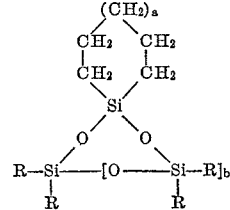

where R is an aryl radical, $a$ is an integral number of from 0 to 1, inclusive, and $b$ is an integral number of from 1 to 2, inclusive.

2. The organocyclopolysiloxane of claim 1, wherein R is phenyl, $a$ is 1, and $b$ is 2.

3. The organocyclopolysiloxane of claim 1, wherein R is phenyl, $a$ is 1, and $b$ is 1.

4. The organocyclopolysiloxane of claim 1, wherein R is tolyl, $a$ is 1, and $b$ is 1.

5. The organocyclopolysiloxane of claim 1, wherein R is tolyl, $a$ is 0, and $b$ is 2.

References Cited

UNITED STATES PATENTS

| | | | |
|---|---|---|---|
| 2,383,817 | 8/1945 | Rochow | 260—448.2 XR |
| 2,464,231 | 3/1949 | Hersh | 260—448.2 |
| 2,615,033 | 10/1952 | Hersh | 260—448.2 |
| 3,328,344 | 6/1967 | Sporck | 260—448.2 XR |

TOBIAS E. LEVOW, *Primary Examiner.*

HELEN M. McCARTHY, *Examiner.*

P. F. SHAVER, *Assistant Examiner.*